United States Patent
Fan Jiang et al.

(10) Patent No.: US 11,754,886 B1
(45) Date of Patent: Sep. 12, 2023

(54) PIXEL LAYOUTS FOR ELECTRONIC DEVICE DISPLAYS

(71) Applicant: Apple Inc., Cupertino, CA (US)

(72) Inventors: Shih-Chyuan Fan Jiang, San Jose, CA (US); Yuechen Wu, San Jose, CA (US); Xiaokai Li, Mountain View, CA (US); Cheng-Ho Yu, Milpitas, CA (US); Zhibing Ge, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/516,499

(22) Filed: Nov. 1, 2021

Related U.S. Application Data

(60) Provisional application No. 63/120,073, filed on Dec. 1, 2020.

(51) Int. Cl.
*G02F 1/1343* (2006.01)
*G02F 1/1335* (2006.01)

(52) U.S. Cl.
CPC .. *G02F 1/134309* (2013.01); *G02F 1/133514* (2013.01); *G02F 1/133553* (2013.01)

(58) Field of Classification Search
CPC ................................................ G02F 1/134309
See application file for complete search history.

(56) References Cited

U.S. PATENT DOCUMENTS

| | | | |
|---|---|---|---|
| 7,084,849 B2 | 8/2006 | Noguchi et al. | |
| 7,982,219 B2 | 7/2011 | Kuo et al. | |
| 8,243,238 B2 * | 8/2012 | Imayama | G02F 1/134363 349/114 |
| 9,070,334 B2 * | 6/2015 | Chen | G09G 3/3648 |
| 9,104,079 B2 | 8/2015 | Jehara et al. | |
| 9,217,872 B2 | 12/2015 | Niioka et al. | |
| 10,636,847 B2 | 4/2020 | Yu et al. | |
| 2018/0120656 A1 * | 5/2018 | Okada | G02F 1/133514 |
| 2020/0073167 A1 * | 3/2020 | Shi | G02F 1/133377 |
| 2021/0364840 A1 * | 11/2021 | Cao | G03F 1/32 |
| 2022/0317495 A1 * | 10/2022 | Feng | G09G 3/36 |

* cited by examiner

*Primary Examiner* — Edmond C Lau

(74) *Attorney, Agent, or Firm* — TREYZ LAW GROUP, P.C.; Joseph F. Guihan

(57) ABSTRACT

Increasing resolution of liquid crystal displays may result in small distances between adjacent liquid crystal display pixels. This tight pixel spacing may reduce transmission through the liquid crystal display pixels and may result in cross-talk between the liquid crystal display pixels. To increase transmission and, correspondingly, display efficiency, a reflective layer may be included in the liquid crystal display. The reflective layer recycles backlight that may otherwise be absorbed, improving transmittance and efficiency. To reduce color shift and color mixing caused by cross-talk, the pixels may have their pixel electrodes arranged in a zigzag layout. Each pixel electrode may have a height that is less than or equal to the total height of the pixel divided by two. The pixel electrodes in a given row are also alternatingly coupled to first and second gate lines. This zigzag layout results in an increased distance between adjacent pixel electrodes, mitigating pixel cross-talk.

12 Claims, 6 Drawing Sheets

US 11,754,886 B1

PIXEL LAYOUTS FOR ELECTRONIC DEVICE DISPLAYS

This application claims the benefit of provisional patent application No. 63/120,073, filed Dec. 1, 2020, which is hereby incorporated by reference herein in its entirety.

BACKGROUND

This relates generally to electronic devices, and, more particularly, to electronic devices with displays.

Electronic devices often include displays. For example, an electronic device may have a liquid crystal display (LCD) based on liquid crystal display pixels. In this type of display, each pixel includes a pixel electrode that selectively applies an electric field to liquid crystal material. This selectively modifies the polarization of backlight that passes through the liquid crystal material, which allows for the display pixels to control the intensity of emitted light.

To control a given pixel in a liquid crystal display, a voltage may be applied to the pixel electrode of the given pixel. Ideally, the voltage at the pixel electrode of the given pixel would not affect any neighboring pixels. However, there may be pixel cross-talk that allows nominally 'off' pixels to emit light due to an adjacent 'on' pixel's leakage. The pixel cross-talk may degrade display performance and cause a color-shift in the resulting image.

It may be desirable to reduce the distance between pixels in a display in order to increase the resolution of the display. However, pixel cross-talk between adjacent LCD pixels may worsen as the distance between pixels decreases.

It would therefore be desirable to be able to provide improved displays for electronic devices.

SUMMARY

An electronic device may have a display such as a liquid crystal display. The liquid crystal display (LCD) may have an array of liquid crystal display pixels formed by a liquid crystal layer that is interposed between transparent substrates and controlled by pixel electrodes.

Each liquid crystal display pixel may have a respective pixel electrode. Voltage may be applied to the pixel electrode of each liquid crystal display pixel to control how much backlight passes through each liquid crystal display pixel. Small distances between adjacent liquid crystal display pixels may reduce transmission through the liquid crystal display pixels and may result in cross-talk between the liquid crystal display pixels.

To increase transmission and, correspondingly, display efficiency, a reflective layer may be included in the liquid crystal display. The reflective layer may have approximately the same footprint as an opaque masking layer that defines the light-emitting area of each pixel. The reflective layer recycles backlight that may otherwise be absorbed, improving transmittance and efficiency.

To reduce color shift and color mixing caused by crosstalk, the pixels may have their pixel electrodes arranged in a zigzag layout. Each pixel electrode may have a height that is less than or equal to the total height of the pixel divided by two. The pixel electrodes in a given row are also alternatingly coupled to first and second adjacent gate lines. This zigzag layout results in an increased distance between adjacent pixel electrodes, mitigating pixel cross-talk.

DETAILED DESCRIPTION

Figure 1:
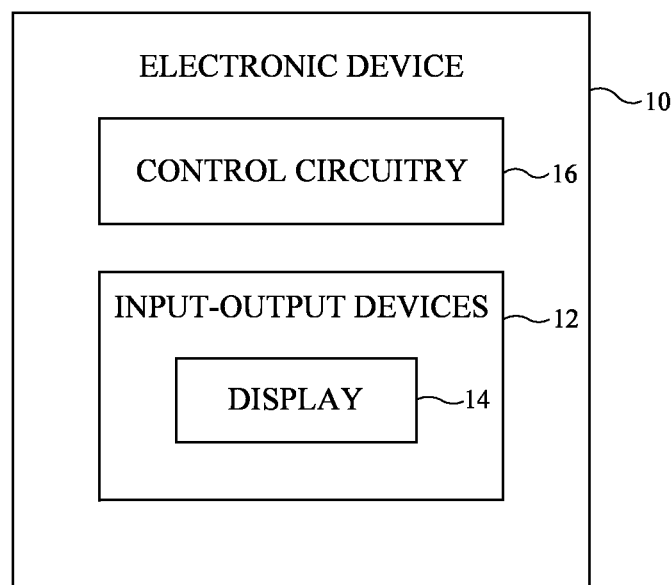
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user. As examples, electronic device 10 may be an augmented reality (AR) headset and/or virtual reality (VR) headset.

As shown in FIG. 1, electronic device 10 may include control circuitry 16 for supporting the operation of device 10. The control circuitry may include storage such as hard disk drive storage, nonvolatile memory (e.g., flash memory or other electrically-programmable-read-only memory configured to form a solid state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Figure 2:
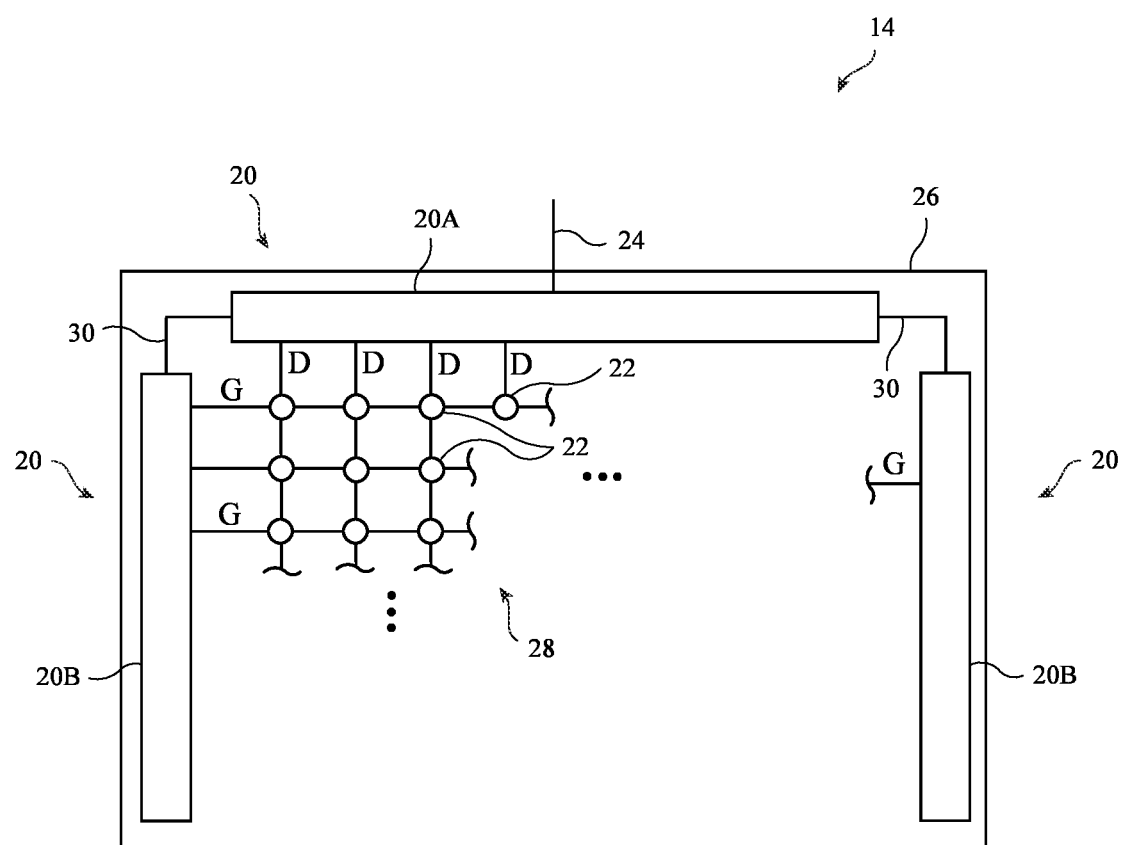
FIG. 2 is a schematic diagram of an illustrative display in accordance with an embodiment.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, silicon layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20.

Gate driver circuitry 20B may include blocks of gate driver circuitry such as gate driver row blocks. Each gate driver row block may include circuitry such output buffers and other output driver circuitry, register circuits (e.g., registers that can be chained together to form a shift register), and signal lines, power lines, and other interconnects. Each gate driver row block may supply one or more gate signals to one or more respective gate lines in a corresponding row of the pixels of the array of pixels in the active area of display 14.

Display 14 for device 10 may be a liquid crystal display, an organic light-emitting diode display, an electrophoretic display, a plasma display, an electrowetting display, a display formed using other display technologies, or a display that uses two or more of these display technologies in a hybrid configuration.

Figure 3:
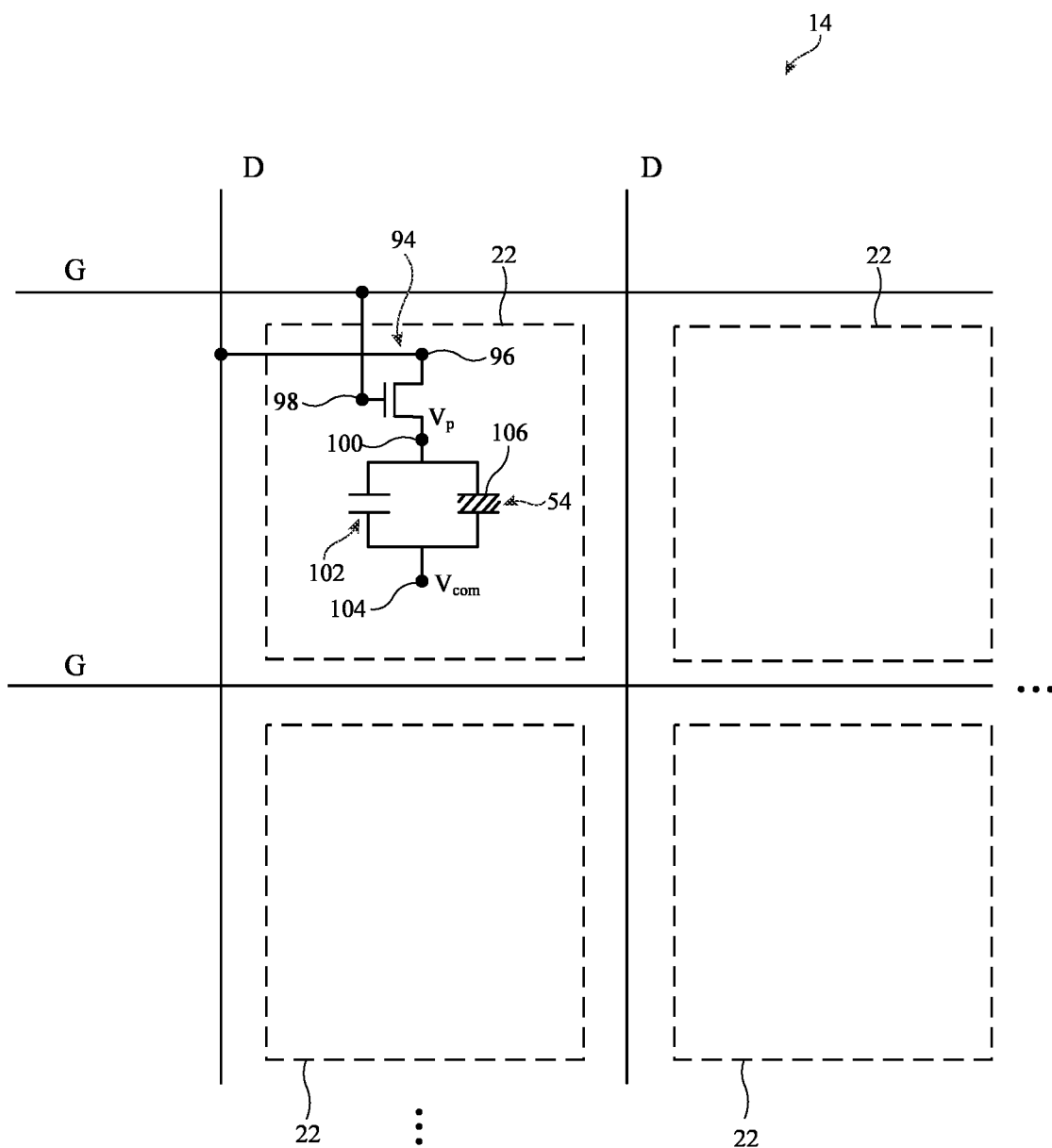
FIG. 3 is a schematic diagram of an illustrative display with liquid crystal display pixels in accordance with an embodiment.

FIG. 3 shows an example of a liquid crystal display. As shown in FIG. 3, liquid crystal display pixels 22 may be arranged in an array having rows and columns. The circuitry of the pixel array (i.e., the rows and columns of pixel circuits for pixels 22) may be controlled using signals such as data line signals on data lines D and gate line signals on gate lines G.

Pixels 22 may contain thin-film transistor circuitry. For example, pixels 22 may contain silicon thin-film transistor circuitry such as polysilicon transistor circuitry or amorphous silicon transistor circuitry, semiconducting oxide thin-film transistor circuitry such as indium gallium zinc oxide transistor circuitry, or other silicon or semiconducting-oxide transistor circuitry. Pixels 22 may also include associated electrode structures for producing electric fields across a liquid crystal layer in display 14. Each of pixels 22 may have one or more thin-film transistors. For example, each pixel 22 may have a respective thin-film transistor such as thin-film transistor 94 to control the application of electric fields to a respective pixel-sized portion 54 of a liquid crystal layer in display 14. Display 14 may contain a color filter layer having an array of color filter elements associated with respective pixels 22 and a thin-film transistor layer on which circuitry such as the circuitry of FIG. 3 is formed. A liquid crystal layer may be interposed between the color filter layer and the thin-film transistor layer. Other configurations for display 14 may be used, if desired. The use of a liquid crystal display technology for forming display 14 is merely illustrative.

The thin-film transistor structures that are used in forming pixels 22 may be located on a thin-film transistor substrate such as a layer of glass. The thin-film transistor substrate and the structures of pixels 22 that are formed on the surface of the thin-film transistor substrate may collectively form a thin-film transistor layer in display 14.

Gate driver circuitry may be used to generate gate signals on gate lines G. The gate driver circuitry may be formed from thin-film transistors on the thin-film transistor layer or may be implemented in separate integrated circuits. The data line signals on data lines D in display 14 carry analog image data (e.g., voltages with magnitudes representing pixel brightness levels). During the process of displaying images on display 14, a display driver integrated circuit may receive digital data from control circuitry in device 10 and may produce corresponding analog data signals. The analog data signals may be demultiplexed and provided to data lines D.

The data line signals on data lines D are distributed to the columns of pixels 22. Gate line signals on gate lines G are provided to the rows of pixels 22 by associated gate driver circuitry.

The circuitry of display 14 such as demultiplexer circuitry, gate driver circuitry, and the circuitry of pixels 22 may be formed from conductive structures (e.g., metal lines and/or structures formed from transparent conductive materials such as indium tin oxide) and may include transistors such as transistor 94 that are fabricated on the thin-film transistor substrate layer of display 14. The thin-film transistors may be, for example, silicon thin-film transistors or semiconducting-oxide thin-film transistors.

One of pixels 22 may be located at the intersection of each gate line G and data line D in display 14. A data signal on each data line D may be supplied to terminal 96 from one of data lines D. Thin-film transistor 94 (e.g., a thin-film polysilicon transistor or an amorphous silicon transistor) may have a gate terminal such as gate 98 that receives gate line control signals on gate line signal path G. When a gate line control signal is asserted, transistor 94 will be turned on and the data signal at terminal 96 will be passed to node 100 as voltage Vp. Data for display 14 may be displayed in frames. Following assertion of the gate line signal in each row to pass data signals to the pixels of that row, the gate line signal may be deasserted. In a subsequent display frame, the gate line signal for each row may again be asserted to turn on transistor 94 and capture new values of Vp.

Each pixel 22 may have a signal storage element such as capacitor 102 or other charge storage elements. Storage capacitor 102 may be used to store signal Vp in each pixel 22 between frames (i.e., in the period of time between the assertion of successive gate signals).

Display 14 may have a common electrode coupled to node 104. The common electrode (which is sometimes referred to as the Vcom electrode) may be used to distribute a common electrode voltage such as common electrode voltage Vcom to nodes such as node 104 in pixels 22. The Vcom electrode 104 may be implemented using a blanket film of a transparent conductive material such as indium tin oxide and/or a layer of metal that is sufficiently thin to be transparent.

In each pixel 22, capacitor 102 may be coupled between nodes 100 and 104. A parallel capacitance (sometimes referred to as capacitance $C_{LC}$) arises across nodes 100 and 104 due to electrode structures in pixel 22 that are used in controlling the electric field through the liquid crystal material 54 of the pixel. As shown in FIG. 3, electrode structures 106 (e.g., a display pixel electrode with multiple fingers or other display pixel electrode for applying electric fields to liquid crystal material 54) may be coupled to node 100 (or a display pixel electrode may be formed at node 104). The capacitance $C_{LC}$ across liquid crystal material 54 is associated with the capacitance between electrode structures 106 and common electrode Vcom at node 104. During operation, electrode structures 106 may be used to apply a controlled electric field (i.e., a field having a magnitude proportional to Vp-Vcom) across pixel-sized liquid crystal material 54 in pixel 22. Due to the presence of storage capacitor 102 and the capacitance $C_{LC}$ of material 54, the value of Vp (and therefore the associated electric field across liquid crystal material 54) may be maintained across nodes 106 and 104 for the duration of the frame.

The electric field that is produced across liquid crystal material 54 causes a change in the orientations of the liquid crystals in liquid crystal material 54. This changes the polarization of light passing through liquid crystal material 54. The change in polarization may, in conjunction with upper and lower polarizers in display 14, be used in controlling the amount of light that is transmitted through each pixel 22 in display 14 (e.g., how much light from a backlight unit is transmitted through each pixel 22).

Figure 4:
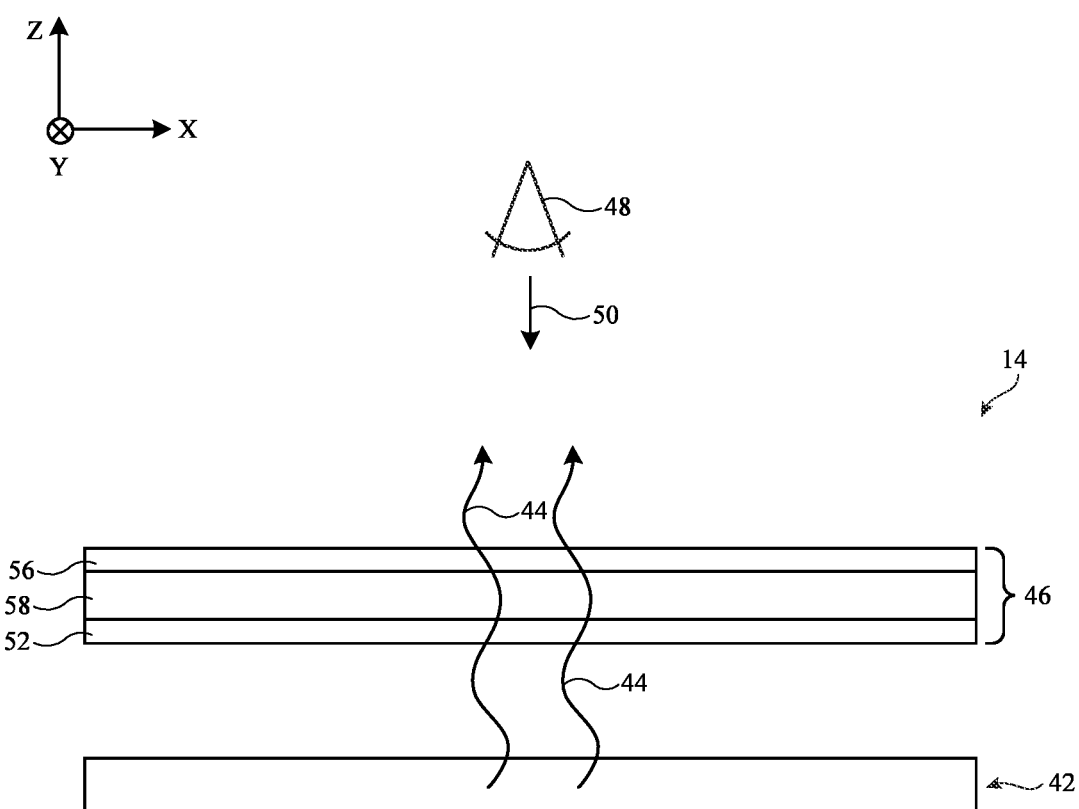
FIG. 4 is a cross-sectional side view of an illustrative display having a backlight and liquid crystal display layers in accordance with an embodiment.

A cross-sectional side view of an illustrative configuration for display 14 of device 10 is shown in FIG. 4. As shown in FIG. 4, display 14 may include a backlight unit such as backlight unit 42 (sometimes referred to as a backlight or backlight structures) for producing backlight 44. During operation, backlight 44 travels outwards (vertically upwards in dimension Z in the orientation of FIG. 4) and passes through pixel structures in display layers 46. This illuminates any images that are being produced by the pixels for viewing by a user. For example, backlight 44 may illuminate images on display layers 46 that are being viewed by viewer 48 in direction 50.

In a configuration in which display layers 46 (sometimes referred to as display panel 46) are used in forming a liquid crystal display, display layers 46 may include liquid crystal display layers 58 (sometimes referred to as display layers 58) that are sandwiched between lower polarizer layer 52 and upper polarizer layer 56. Liquid crystal display layers 58 may include a liquid crystal layer that is interposed between first and second substrates, as will be discussed in greater detail in connection with FIG. 5.

Any desired arrangement may be used for backlight structures 42. In one possible arrangement, the backlight structures include a light guide layer (formed from a transparent material such as clear glass or plastic). During operation of the backlight structures, a light source (e.g., one or more light-emitting diodes) may emit light into an edge of the light guide layer. The light is distributed throughout the light guide layer and is scattered upwards (in the positive Z-direction) to serve as backlight for the display. This type of arrangement may be referred to as an edge-lit backlight. Alternatively, a direct-lit backlight may be used. In a direct-lit backlight, an array of light-emitting diodes may be formed underneath the display layers. Each light-emitting diode may provide backlight for a respective portion (cell) of the display. One or more light spreading layers may be incorporated to avoid hotspots caused by the light-emitting diodes.

Lower polarization layer 52 ensures that all backlight received by the liquid crystal display layers 58 have a uniform polarization. The liquid crystal display layers 58 may then selectively modify the polarization of the light to control how much light passes through upper polarization layer 56.

Figure 5:
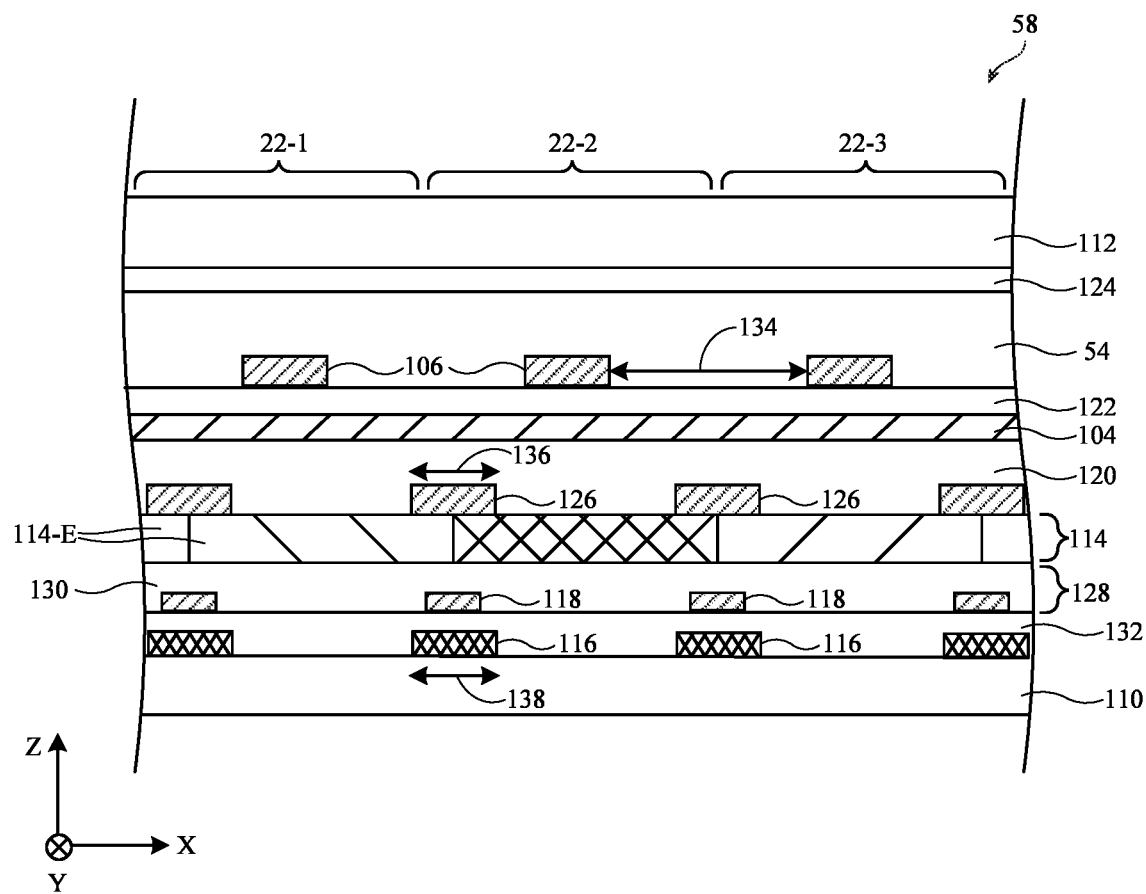
FIG. 5 is a cross-sectional side view of illustrative liquid crystal display layers that include a reflective metal layer underneath an opaque masking layer in accordance with an embodiment.

To control a given pixel in a liquid crystal display, a voltage may be applied to the pixel electrode of the given pixel. Ideally, the voltage at the pixel electrode of the given pixel would not affect any neighboring pixels. However, there may be pixel cross-talk that allows nominally 'off' pixels to emit light due to an adjacent 'on' pixel's leakage. The pixel cross-talk may degrade display performance and cause a color-shift in the resulting image. Cross-talk may be exacerbated as spacing between adjacent pixels decreases (e.g., to provide high resolution displays). FIG. 5 is a cross-sectional side view of illustrative liquid crystal display layers that are arranged to mitigate cross-talk (even with tightly spaced pixels).

As shown in FIG. 5, liquid crystal display layers 58 include an upper substrate 112 and a lower substrate 110. Layers 110 and 112 may be formed from transparent substrate layers such as clear layers of glass, plastic, or any other desired material. Liquid crystal layer 54 may be sandwiched between substrates 110 and 112.

Pixel electrodes 106 control the electric field through the liquid crystal material 54. The electric field that is produced across liquid crystal material 54 causes a change in the orientations of the liquid crystals in liquid crystal material 54. This changes the polarization of light passing through liquid crystal material 54. The change in polarization may, in conjunction with upper polarizer 56 and lower polarizer 52 (as shown in FIG. 4), be used in controlling the amount of light that is transmitted through each pixel 22 in display 14 (e.g., how much light from a backlight unit is transmitted through each pixel 22). The liquid crystal display layers also include common electrode 104. Common electrode 104 and pixel electrodes 106 are separated by passivation layer 122. Passivation layer 122 (sometimes referred to as insulating layer 122) may be formed from any desired material.

Thin-film transistor circuitry 128 may be formed on substrate 110 and may be used to control the pixel electrodes 106. As shown in FIG. 5, thin-film transistor circuitry 128 may include various conductive components such as signal lines 118 in FIG. 5 (e.g., gate lines and/or data lines as shown in FIGS. 2 and 3), thin-film transistors such as transistors 94 in FIG. 3, and any other desired components. One or more dielectric layers 130 may be incorporated to isolate the components of thin-film transistor layer 128 as desired.

Color filter layer 114 may include a plurality of color filter elements 114-E. Each color filter element is overlapping with a respective pixel 22. Red color filter elements, green color filter elements, blue color filter elements, and/or color filter elements of other desired colors may be included in color filter layer 114. An opaque masking layer 126 is formed between each adjacent pair of color filter elements. Opaque masking layer 126 (sometimes referred to as black masking layer 126, black matrix 126, etc.) prevents cross-talk between adjacent pixels in the display. One or more dielectric layers 120 (which may be formed form any desired material) may be interposed between color filter layer 114 (and opaque masking layer 126) and common electrode 104. An overcoat layer 124 (which may be formed form any desired material) may be interposed between the upper substrate 112 and liquid crystal layer 54.

The illustrative arrangement for pixel electrodes 106 and common electrode 104 are merely illustrative. In general, the liquid crystal display pixels 22 may operate using fringe-field switching, in-plane switching, or any other desired type of switching technique.

The pixels of the liquid crystal display panel of FIG. 5 may be tightly spaced to enable a high resolution display. As shown, adjacent pixel electrodes 106 may be separated by a distance 134. Distance 134 may be less than 20 microns, less than 10 microns, less than 6 microns, less than 5 microns, between 3 and 5 microns, between 2 and 10 microns, greater than 2 microns, greater than 4 microns, etc.

Forming tightly spaced pixels of this type may reduce the transmission of backlight through the liquid crystal display panel. The reduced transmission may occur as a result of the opaque masking layer 126 occupying a large part of each overall pixel area. In one example, the light-emitting area may occupy a smaller percentage of each pixel than the opaque masking layer. Having so much of each pixel occupied by the opaque masking layer decreases transmittance through the pixel and, accordingly, decreases efficiency of the display.

Positioning color filter layer 114 between liquid crystal layer 54 and thin-film transistor layer 128 (as in FIG. 5) may increase efficiency of the display (even when the display has tightly spaced pixels). In the arrangement of FIG. 5, color filter layer 114 is also positioned between liquid crystal layer 54 and the backlight unit 42. In another possible arrangement, the color filter layer 114 may be positioned between liquid crystal layer 54 and upper substrate 112. However, instead using the arrangement of FIG. 5 may increase the transmittance through the pixels and the efficiency of the display. This arrangement of the color filter layer on the thin-film transistor layer may sometimes be referred to as a color filter on array (COA) LCD.

Additional transmittance (and efficiency) improvements may be obtained by including reflective layer 116 in display 14. As shown in FIG. 5, reflective layer 116 may be formed underneath opaque masking layer 126. Reflective layer 116 may be formed from a metal (such as silver or aluminum) or any other desired material. Reflective layer 116 may have a reflectivity of greater than 80%, greater than 90%, greater than 95%, greater than 99%, etc.

Reflective layer 116 may reflect light from backlight unit 42 that is subsequently recycled and passes through the light-emitting area of each pixel. Without reflective layer 116, some of this light would instead be absorbed (e.g., by opaque masking layer 126). Including reflective layer 116 increases the likelihood of backlight 44 (from backlight unit 42) ultimately passing through the pixel aperture (due to the recycling caused by reflective layer 116).

In one possible arrangement, reflective layer 116 may have the same footprint as opaque masking layer 126. Opaque masking layer 126 may have a width 136 whereas reflective layer 116 has a width 138. Widths 136 and 138 of the layers between adjacent pixels may be the same or similar (e.g., within 10%, within 5%, within 1%, etc.). Opaque masking layer 126 directly overlaps reflective layer 116 in the vertical direction (e.g., parallel to the Z-direction).

One or more dielectric layers 132 may be interposed between lower substrate 110 and thin-film transistor layer 128.

Having a small distance between adjacent pixel electrodes may lead to cross-talk between adjacent pixels. For example, consider the example where pixel 22-2 is intended to be 'on' (e.g., pass backlight with a maximum brightness) and pixels 22-1 and 22-3 are intended to be 'off' (e.g., pass no backlight). Applying voltage to the pixel electrode for 22-2 may cause pixel 22-2 to emit light (as desired). However, leakage current between pixel 22-2 and the adjacent pixels 22-1 and 22-3 may cause pixels 22-1 and 22-3 to also emit light (even though they are nominally off). This pixel cross-talk may have undesired effects such as color shift at off-axis viewing angles and color mixing at on-axis viewing angles.

Figure 6:
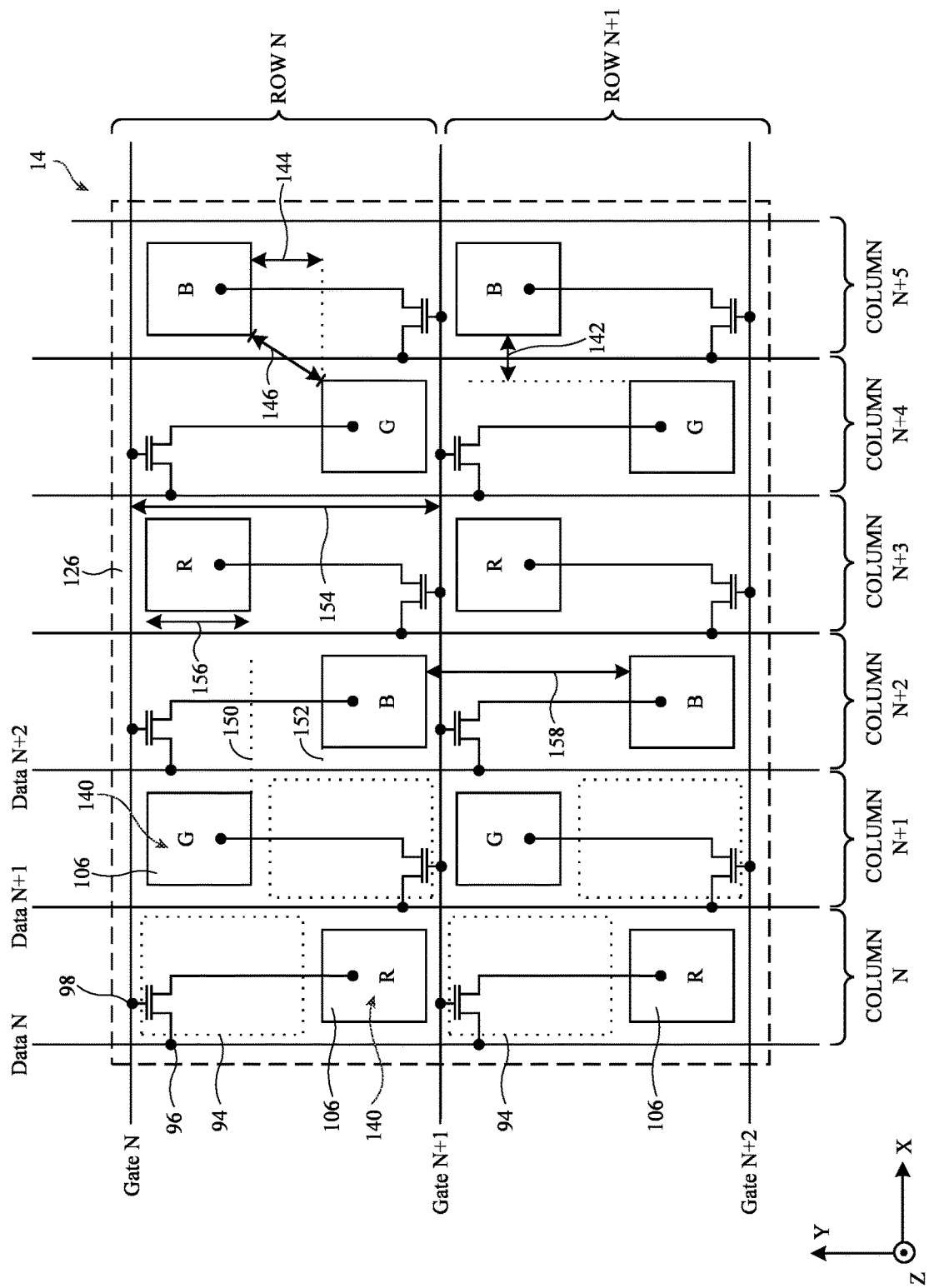
FIG. 6 is a top view of an illustrative display having a zigzag layout of pixel electrodes in accordance with an embodiment.

To mitigate cross-talk caused by tight spacing of the liquid crystal display pixels, a zigzag pixel arrangement may be used. FIG. 6 is a top view of an illustrative display showing how a zigzag pixel layout may be used to mitigate cross-talk. Columns and rows of pixels are arranged in the display of FIG. 6. The total pixel height and width may be uniform across the display. Each pixel includes an aperture 140 (sometimes referred to as opening 140 or light-emitting area 140) that is surrounded by opaque masking layer 126. Pixel apertures corresponding to red pixels are labeled R, pixel apertures corresponding to green pixels are labeled G, and pixel apertures corresponding to blue pixels are labeled B. Each pixel also includes a respective transistor 94 that is obscured by the opaque masking layer 126. Similar to as shown in FIG. 3, each transistor 94 has a gate terminal 98 that is coupled to a respective gate line and a terminal 96 that is coupled to a respective data line. Transistor 94 may apply a desired voltage to a pixel electrode 106 that is overlapped by pixel aperture 140.

Cross-talk between adjacent pixels may be reduced by increasing the distance between adjacent pixel electrodes. In the zigzag arrangement of FIG. 6, adjacent pixel apertures 140 (and corresponding pixel electrodes 106) are separated by a first distance 142 in the X-direction as well as a second distance 144 in the Y-direction. The total distance 146 between adjacent pixel electrodes (e.g., the corner-to-corner distance) is therefore increased relative to an example where there is no vertical separation 144.

Corner-to-corner distance 146 may be greater than 2 microns, greater than 4 microns, greater than 6 microns, greater than 8 microns, less than 10 microns, between 2 and 10 microns, between 2 and 25 microns, etc.

Said another way, each pixel electrode does not overlap the adjacent pixel electrode in the horizontal direction (e.g., parallel to the X-axis). Consider the pixel aperture in row N and column N+1. The pixel aperture for this green pixel has a lower edge that extends parallel to axis 150. As shown, axis 150 is separated (in the Z-direction by distance 144) from the axis 152 of the upper edge of the pixels in row N, column N and row N, column N+2. Axis 150 intersects (e.g., is colinear with) the lower edge of every other pixel electrode in its row. Axis 150 does not intersect the pixel electrode of every other pixel its row.

Each pixel electrode 106 is positioned between adjacent pixel transistors 94 (not between adjacent pixel electrodes 106). This increases the separation between pixel electrodes to corner-to-corner distance 146, which mitigates cross-talk between the pixels.

A zigzag gate driving scheme is used to handle driving the pixels of FIG. 6. As shown, each gate line is coupled to every other pixel in one row and every other pixel in another, adjacent row. Consider gate line N+1. This gate line is coupled to the red pixel in Row N+1, column N, the green pixel in row N, column N+1, the blue pixel in row N+1, column N+2, the red pixel in row N, column N+3, the green pixel in row N+1, column N+4, and the blue pixel in row N, column N+5. Instead of being coupled to every pixel in row N+1, gate line N+1 is coupled to every other pixel in row N+1 and every other pixel in row N. This pattern may be repeated for each gate line in the array. For each pixel electrode coupled to a respective gate line, a transistor (94) is interposed between that pixel electrode and the respective gate line.

Each pixel may have a total height 154 (e.g., the dimension parallel to the Y-axis in FIG. 6). Each pixel aperture (and pixel electrode) may also have a respective height 156 (e.g., the dimension parallel to the Y-axis in FIG. 6). Height 156 may be less than or equal to height 154 divided by two ($H_{APERTURE} \leq (H_{TOTAL}/2)$). This ensures that pixel apertures in adjacent columns do not overlap in the X-direction (which increases the distance between the pixel electrodes to mitigate cross-talk).

This property may also be described relative to the distance 158 in the Y-direction. As shown in FIG. 6, distance 158 is a measure of the distance between pixel electrodes in adjacent rows. In other words, the opaque masking layer that is interposed between the lower edge of the pixel aperture in row N, column N+2 and the pixel aperture in row N+1, column N+2 has a dimension (width) 158. Distance 158 may be greater than or equal to the height 156 of each pixel aperture. Again, this ensures that pixel apertures in adjacent columns do not overlap in the X-direction (which increases the distance between the pixel electrodes to mitigate cross-talk). With the properties described above, the edge of a first pixel aperture may, at closest, be colinear with the edge of a pixel aperture in an adjacent column.

The pixel layout of FIG. 6 increases the distance between each adjacent pixel electrode in the display. Accordingly, cross-talk between the pixels is mitigated and color mixing and color shift is improved.

It should be understood that display 14 in FIG. 6 has a cross-sectional arrangement as shown in FIG. 5. The color filter layer in display 14 in FIG. 6 is interposed between the liquid crystal layer and the lower substrate (as in FIG. 5). Additionally, opaque masking layer 126 in FIG. 6 overlaps a reflective layer (e.g., reflective layer 116 in FIG. 5). The reflective layer may have the same footprint as the opaque masking layer 126 in FIG. 6.

These examples are merely illustrative. The pixel layout shown in FIG. 6 may instead be applied to a display having any desired cross-sectional arrangement.

The foregoing is merely illustrative and various modifications can be made by those skilled in the art without departing from the scope and spirit of the described embodiments. The foregoing embodiments may be implemented individually or in any combination.

What is claimed is:

1. A display comprising:
   an array of pixels in rows and columns;
   a plurality of data lines that are coupled to the array of pixels, wherein each data line is coupled to a respective column of pixels; and
   a plurality of gate lines that are coupled to the array of pixels, wherein a given gate line of the plurality of gate lines is coupled to every other pixel in a first row and every other pixel in a second, adjacent row.

2. The display defined in claim 1, wherein each pixel comprises a respective pixel electrode and wherein the pixel electrodes are arranged in a zigzag layout.

3. The display defined in claim 2, further comprising:
an opaque masking layer; and
a plurality of pixel apertures that each overlap a respective pixel electrode, wherein the plurality of pixel apertures is arranged in the zigzag layout.

4. The display defined in claim 1, wherein each pixel comprises a pixel electrode and a transistor that is coupled between the respective pixel electrode and one of the plurality of gate lines.

5. The display defined in claim 4, wherein, for each pixel, the transistor is interposed between the pixel electrode and the one of the plurality of gate lines.

6. The display defined in claim 5, further comprising:
an opaque masking layer; and
a plurality of pixel apertures that each overlap a respective pixel electrode, wherein each one of the plurality of gate lines extends in a first direction, wherein each pixel aperture has a first height that extends in a second direction that is orthogonal to the first direction, wherein the opaque masking layer between adjacent pixel apertures in the same column and different rows has a second height, and wherein the second height is greater than or equal to the first height.

7. The display defined in claim 4, further comprising:
an opaque masking layer, wherein each one of the transistors is overlapped by the opaque masking layer.

8. The display defined in claim 7, further comprising:
a reflective layer that is overlapped by the opaque masking layer.

9. The display defined in claim 8, further comprising:
a first transparent substrate;
a second transparent substrate;
a liquid crystal layer that is interposed between the first and second transparent substrates;
a thin-film transistor layer that is interposed between the second transparent substrate and the liquid crystal layer; and
a color filter layer that is interposed between the thin-film transistor layer and the liquid crystal layer.

10. The display defined in claim 1, wherein the given gate line is coupled to odd numbered columns in the first row and even numbered columns in the second, adjacent row.

11. The display defined in claim 5, wherein each one of the plurality of gate lines extends in a first direction, wherein each pixel has a first total height that extends in a second direction that is orthogonal to the first direction, wherein each pixel electrode has a second height that extends in the second direction, and wherein the second height is less than or equal to the total height divided by two.

12. A display comprising:
an array of pixels in rows and columns;
a plurality of data lines that are coupled to the array of pixels, wherein each data line is coupled to a respective column of pixels;
a plurality of gate lines that are coupled to the array of pixels, wherein a given gate line of the plurality of gate lines is coupled to every other pixel in a first row and every other pixel in a second, adjacent row, wherein each pixel comprises a pixel electrode and a transistor that is coupled between the respective pixel electrode and one of the plurality of gate lines, wherein, for each pixel, the transistor is interposed between the pixel electrode and the one of the plurality of gate lines; and
a plurality of pixel apertures that each overlap a respective pixel electrode, wherein each one of the plurality of gate lines extends in a first direction, wherein each pixel has a total height that extends in a second direction that is orthogonal to the first direction, wherein each pixel aperture has a second height that extends in the second direction, and wherein the second height is less than or equal to the total height divided by two.

* * * * *